US009562961B1

(12) United States Patent
Baker

(10) Patent No.: US 9,562,961 B1
(45) Date of Patent: Feb. 7, 2017

(54) APPARATUS, METHOD, AND SYSTEM FOR ESTIMATING THE ANGLE OF ARRIVAL OF A SIGNAL

(71) Applicant: The Boeing Company, Chicago, IL (US)

(72) Inventor: James B. Baker, Kent, WA (US)

(73) Assignee: The Boeing Company, Chicago, IL (US)

( * ) Notice: Subject to any disclaimer, the term of this patent is extended or adjusted under 35 U.S.C. 154(b) by 740 days.

(21) Appl. No.: 13/780,605

(22) Filed: Feb. 28, 2013

(51) Int. Cl.
G01S 5/02 (2010.01)
G01S 5/04 (2006.01)
G01S 3/46 (2006.01)

(52) U.S. Cl.
CPC ........................................ G01S 3/46 (2013.01)

(58) Field of Classification Search
CPC ................. G01S 3/46; G01S 3/48; G01S 5/04
USPC ................... 342/417, 430, 437, 442, 443
See application file for complete search history.

(56) References Cited

U.S. PATENT DOCUMENTS

| 4,042,929 | A |   | 8/1977 | Dorey |
| 5,724,047 | A | * | 3/1998 | Lioio et al. .................... 342/442 |
| 5,745,081 | A |   | 4/1998 | Brown et al. |
| 2007/0146198 | A1 | * | 6/2007 | Chung et al. ............ 342/357.06 |
| 2011/0074631 | A1 | * | 3/2011 | Parker ............................ 342/378 |

* cited by examiner

Primary Examiner — Dao Phan
(74) Attorney, Agent, or Firm — Kunzler Law Group, PC

(57) ABSTRACT

A system for estimating an angle of arrival of a signal includes an object, a movable component that is movably coupled to the object, and at least first and second spaced-apart antennas coupled to the movable component. The system also includes a controller that is configured to estimate an angle of arrival of a signal based on a difference between a time the signal arrives at the first antenna and a time the signal arrives at the second antenna while the movable component is moving, and a difference between a frequency of arrival of the signal at the first antenna and a frequency of arrival of the signal at the second antenna while the movable component is moving.

21 Claims, 5 Drawing Sheets

APPARATUS, METHOD, AND SYSTEM FOR ESTIMATING THE ANGLE OF ARRIVAL OF A SIGNAL

FIELD

This disclosure relates to tracking systems, and more particularly to estimating the angle of arrival of a signal at an object being tracked.

BACKGROUND

Known tracking techniques often utilize the angle of arrival (or arrival angle) of an incoming signal to determine a position of one platform relative to another platform. The platforms may be stationary or moving relative to each other. In some applications, one platform is stationary and the other platform is moving. In yet other applications, both platforms are moving. In a common application, the platform transmitting the signal is stationary and the platform receiving the signal is moving. For example, in aerospace applications, the signal-transmitting platform can be a flight control element positioned on the ground and the signal-receiving platform can be an aircraft in flight (e.g., airborne). In such applications, the angle of arrival is defined as the angle between the direction of the signal received by the aircraft (which corresponds with the position of the signal-transmitting platform) and the orientation of the aircraft. The orientation of the aircraft is commonly associated with the direction of travel of the aircraft.

Certain conventional tracking techniques determine the angle of arrival of a signal from a signal-transmitting platform by comparing the characteristics of signals received by two or more spaced-apart, signal-receiving aircraft. The signal characteristics may include the time of arrival of the signal at the two signal-receiving aircraft and/or the frequency of arrival of the signal at the two signal-receiving aircraft. The geographical diversity between the two signal-receiving aircraft and the relative velocities of the aircraft promoted the accuracy of such multi-platform techniques. However, such multi-platform techniques require two or more aircraft for proper execution, which may be difficult and costly to implement. Accordingly, in many instances, determining the angle of arrival of a signal at a signal-receiving aircraft independent of other signal-receiving aircraft or platforms is desirable.

Some single-platform tracking techniques determine the angle of arrival of an incoming signal at a signal-receiving aircraft, without relying on other signal-receiving aircraft or platforms. Such single-platform techniques are based on a difference in the time of arrival of the signal at two different antennas on the aircraft and/or a difference in the frequency of arrival of the signal at the two different antennas. However, because the distance between the antennas on the aircraft is negligible and the antennas are not moving relative to each other, the use of time-difference-of-arrival (TDOA) techniques and frequency-difference-on-arrival (FDOA) techniques often resulted in inaccurate estimations of the angle of arrival.

SUMMARY

The subject matter of the present application has been developed in response to the present state of the art, and in particular, in response to the problems and needs of object tracking systems that have not yet been fully solved by currently available systems. For example, although conventional tracking systems for locating and following aircraft attempt to estimate the angle of arrival of a signal using various techniques, such techniques may require expensive and extraneous components to achieve accurate results or fail to provide accurate results. Generally, the subject matter of the present application has been developed to provide a tracking system that utilizes an apparatus, system, or method for estimating an angle of arrival of a signal that overcomes at least some of the above-discussed shortcomings of prior art tracking systems.

According to one embodiment, described herein is an apparatus for estimating an angle of arrival of a signal transmitted from a signal-transmitting platform at a signal-receiving platform. The signal-receiving platform includes an object and a movable component coupled to the object. The movable component includes spaced-apart first and second antennas. The apparatus includes a time-difference-of-arrival (TDOA) module that is configured to determine a difference between a time the signal arrives at the first antenna and a time the signal arrives at the second antenna. Additionally, the apparatus includes a frequency-difference-of-arrival (FDOA) module that is configured to determine a difference between a frequency of arrival of the signal at the first antenna and a frequency of arrival of the signal at the second antenna. The apparatus also includes a comparison module configured to estimate the angle of arrival of the signal based on a comparison between the difference between the time the signal arrives at the first antenna and the time the signal arrives at the second antenna and the difference between the frequency of arrival of the signal at the first antenna and the frequency of arrival of the signal at the second antenna.

In some implementations of the apparatus, the TDOA module estimates a first angle of arrival based on the difference between the time the signal arrives at the first antenna and the time the signal arrives at the second antenna, and the FDOA module estimates a second angle of arrival based on the difference between the frequency of arrival of the signal at the first antenna and the frequency of arrival of the signal at the second antenna. The comparison module is configured to estimate the angle of arrival of the signal based on a comparison between the first angle of arrival and the second angle of arrival.

According to certain implementations of the apparatus, the comparison between the first angle of arrival and the second angle of arrival comprises calculating an average of the first angle of arrival and the second angle of arrival. In some implementations, the average of the first angle of arrival and the second angle of arrival is a weighted average based on a higher confidence in the accuracy of one of the first angle of arrival and the second angle of arrival. In yet some implementations, the average of the first angle of arrival and the second angle of arrival is a weighted average based on a variance of errors of the first angle of arrival and the second angle of arrival.

In some implementations of the apparatus, the comparison module estimates the angle of arrival by setting the angle of arrival approximately equal to the first angle of arrival and resolving quadrant ambiguity based on the second angle of arrival. In other implementations, the comparison module estimates the angle of arrival by setting the angle of arrival approximately equal to the second angle of arrival and resolving quadrant ambiguity based on the first angle of arrival.

According to certain implementations of the apparatus, the TDOA module estimates the first angle of arrival based further on a distance between the first and second antennas and a speed of the signal. In one implementation, the TDOA module estimates the first angle of arrival according to the following relationship $$\Delta t = \frac{L}{C}\cos\theta,$$

where $\Delta t$ represents the difference between the time the signal arrives at the first antenna and the time the signal arrives at the second antenna, L represents a distance between the first and second antennas, C represents a speed of the signal, and $\theta$ represents the first angle of arrival.

According to certain implementations of the apparatus, the FDOA module estimates the second angle of arrival based on a velocity of the first and second antennas, an origination frequency of arrival of the signal, and a speed of the signal. In one implementation, the FDOA module estimates the second angle of arrival according to the following relationship $$\Delta f = \frac{2Vf_0}{C}\sin\theta,$$

where $\Delta f$ represents the difference between the frequency of arrival of the signal at the first antenna and the frequency of arrival of the signal at the second antenna, V represents a linear velocity of the first and second antennas, $f_0$ represents an origination frequency of arrival of the signal, C represents a speed of the signal, and $\theta$ represents the second angle of arrival.

In some implementations, the apparatus also includes a movable component position module that is configured to determine a position of the movable component relative to the object and modify the angle of arrival of the signal based on the position of the movable component relative to the object.

According to yet another embodiment, a method for estimating an angle of arrival of a signal includes moving a first antenna relative to a second antenna spaced apart from the first antenna. The method also includes receiving a signal at the first antenna and the second antenna. Additionally, the method includes measuring a difference between a time the signal arrives at the first antenna and a time the signal arrives at the second antenna while the first antenna is moving relative to the second antenna, and measuring a difference between a frequency of arrival of the signal at the first antenna and a frequency of arrival of the signal at the second antenna while the first antenna is moving relative to the second antenna. The method further includes estimating an angle of arrival of the signal based on the difference between the time the signal arrives at the first antenna and the time the signal arrives at the second antenna, and the difference between the frequency of arrival of the signal at the first antenna and the frequency of arrival of the signal at the second antenna.

In some implementations, the method also includes estimating a first angle of arrival based on the difference between the time the signal arrives at the first antenna and the time the signal arrives at the second antenna, and estimating a second angle of arrival based on the difference between a frequency of arrival of the signal at the first antenna and the frequency of arrival of the signal at the second antenna. In such implementations, estimating the angle of arrival of the signal can include comparing the first angle of arrival and the second angle of arrival. Comparing the first angle of arrival and the second angle of arrival may include determining an average of the first angle of arrival and the second angle of arrival. Estimating the angle of arrival of the signal can then include setting the angle of arrival of the equal to the average of the first angle of arrival and the second angle of arrival.

According to certain implementations, moving the first antenna relative to the second antenna includes rotating the first antenna about an axis and rotating the second antenna about the axis. In some implementations, moving the first antenna relative to the second antenna comprises moving the first and second antennas relative to an object. In such implementations, the method may further include determining a position of the first and second antennas relative to the object and modifying the angle of arrival of the signal based on the position of the first and second antennas relative to the object.

In yet another embodiment, a system for estimating an angle of arrival of a signal includes an object, a movable component that is movably coupled to the object, and at least first and second spaced-apart antennas coupled to the movable component. The system also includes a controller that is configured to estimate an angle of arrival of a signal based on a difference between a time the signal arrives at the first antenna and a time the signal arrives at the second antenna while the movable component is moving, and a difference between a frequency of arrival of the signal at the first antenna and a frequency of arrival of the signal at the second antenna while the movable component is moving.

In one implementation of the system, the object is a body of a helicopter, and the movable component is a blade rotatably coupled to the body. The first and second spaced-apart antennas are positioned at respective end portions of the blade. The system may further include a blade position sensor that is configured to detect a position of the blade with respect to the body. The controller is configured to estimate the angle of arrival of the signal based on the position of the blade with respect to the body. According to some implementations, the blade is a first blade, and the system further includes a second blade rotatably coupled to the body of the helicopter, and at least third and fourth spaced-apart antennas coupled to the second blade. The controller can be configured to estimate an angle of arrival of a signal based on a difference between a time the signal arrives at the third antenna and a time the signal arrives at the fourth antenna while the second blade is moving, and a difference between a frequency of arrival of the signal at the third antenna and a frequency of arrival of the signal at the fourth antenna while the second blade is moving.

In certain embodiments, the modules of the apparatus described herein may each include at least one of logic hardware and executable code, the executable code being stored on one or more memory devices. The executable code may be replaced with a computer processor and computer-readable storage medium that stores executable code executed by the processor.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
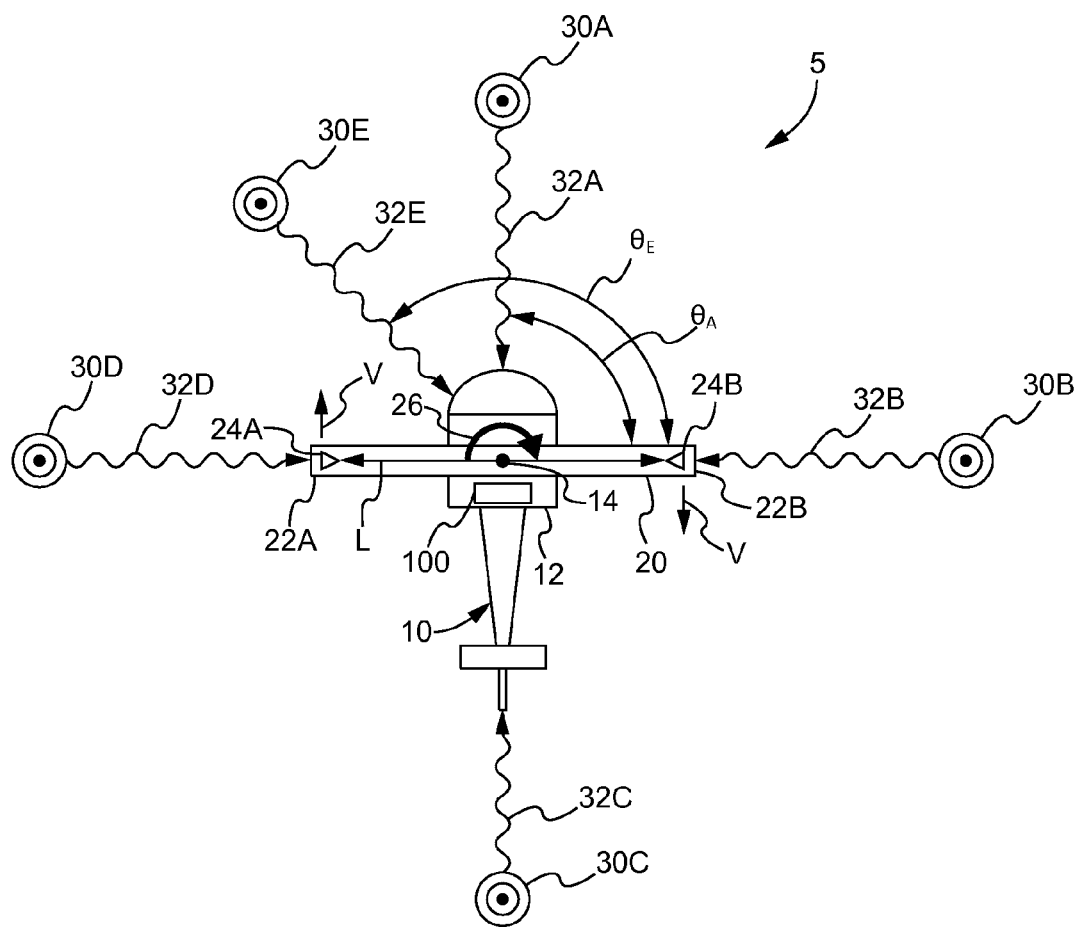
FIG. 1 is a top plan view of a tracking system that has a helicopter with a blade in a first position relative to a plurality of signal-transmitting platforms according to one embodiment.

Referring to FIG. 1, one embodiment of a tracking system 5 for estimating an angle of arrival of a signal is shown. The tracking system 5 includes a signal-receiving platform, which in the illustrated embodiment is a helicopter 10 with a rotatable blade 20. The blade 20 is rotatably coupled to a body 12 or fuselage of the helicopter 10 via a rotor mechanism 14. As shown by directional arrow 26, the blade 20 rotates about the rotor mechanism 14 relative to the body 12.

In the illustrated embodiment, from a top-down perspective, the blade 20 rotates in a clockwise direction 26 relative to the body 12.

In one implementation, the blade 20 is an elongate, narrow airfoil that extends from a first end portion 22A (e.g., first tip) to a second end portion 22B (e.g., second tip) opposing the first end portion. Proximate the first and second end portions 22A, 22B of the blade 20 are respective signal-receiving elements (e.g., first and second antennas 24A, 24B), which are spaced a distance L apart from each other. As the blade 20 rotates relative to the body 12, the first and second end portions 22A, 22B, as well as the first and second antennas 24A, 24B, move at a linear velocity V in a direction perpendicular to the axis of rotation of the rotor mechanism 14 as indicated. The linear velocity V of each antenna 24A, 24B is a function of the rotational or angular velocity co (e.g., rotations-per-minute (RPM)) of the blade 20, and the distance r between the rotational axis of the rotor mechanism 14 and the associated antenna as follows $$V=\omega r \tag{1}$$

where r is equal to L/2, or half the distance L between the antennas 24A, 24B.

In one implementation, each antenna 24A, 24B is an omni-directional antenna configured to receive incoming signals from any direction. For aerodynamic benefits, in some implementations, the antennas 24A, 24B are embedded into the blade 20. Although not shown, information derived from a signal received by the antennas 24A, 24B can be communicated to a controller 100 on the helicopter 10. The information may be communicated via any of various communication devices known in the art, such as wires, cables, wireless components, including transceivers and receivers, and the like. In the case of wires and cables, the helicopter 10 may include mechanical or electro-mechanical components coupled to (e.g., integrated with) the rotor mechanism 14 of the helicopter.

Although a helicopter 10 that has a rotating blade 20 with spaced-apart antennas 24A, 24B is shown in the illustrated embodiment, in other embodiments, the system 5 can include any object with spaced-apart antennas coupled to a movable component that is movable relative to the object. As defined herein, the object can be any of various types of movable or stationary objects, such as aircraft, cars, trucks, trains, spacecraft, and the like. Similarly, as defined herein, the movable component can be any of various rotating components, reciprocating components, oscillating components, and the like.

The tracking system 5 also includes at least one signal-transmitting platform capable of generating a signal that is receivable by the signal-receiving elements of the signal-receiving platform. In the illustrated embodiment, the tracking system 5 includes a plurality of signal-transmitting platforms 30A-30E each configured to generate a respective signal 32A-32E, which can be received the antennas 24A, 24B of the helicopter 10. Although the tracking system 5 in the illustrated embodiment includes five signal-transmitting platforms 30A-30E, in other embodiments, the tracking system 5 can include one, two, three, four, or more than five signal-transmitting platforms. Each of the signal-transmitting platforms 30A-30E can be any of various types of signal-transmitting platforms known in the art without limitation. For example, a signal-transmitting platform may be stationary or moving. In a common application, the signal-transmitting platform is located on the ground and is stationary relative to the ground. In other applications, the signal-transmitting platform is airborne and moving relative to the ground.

Each signal 32A-32E transmitted by the respective signal-transmitting platforms 30A-30E can be any of various types of wireless signals associated with any of various types of wireless communication protocols. For example, one or more of the signals 32A-32E can be a type of electromagnetically-generated signal, such as radio waves, but can also be a type of light-based signal, such as infrared (IR). Other types of signals include ultrasonic and microwave signals. Generally, each signal 32A-32E conveys data or information via a carrier wave or other waveform. The waveform of each signal 32A-32E can be continuous or pulsed.

Figure 4:
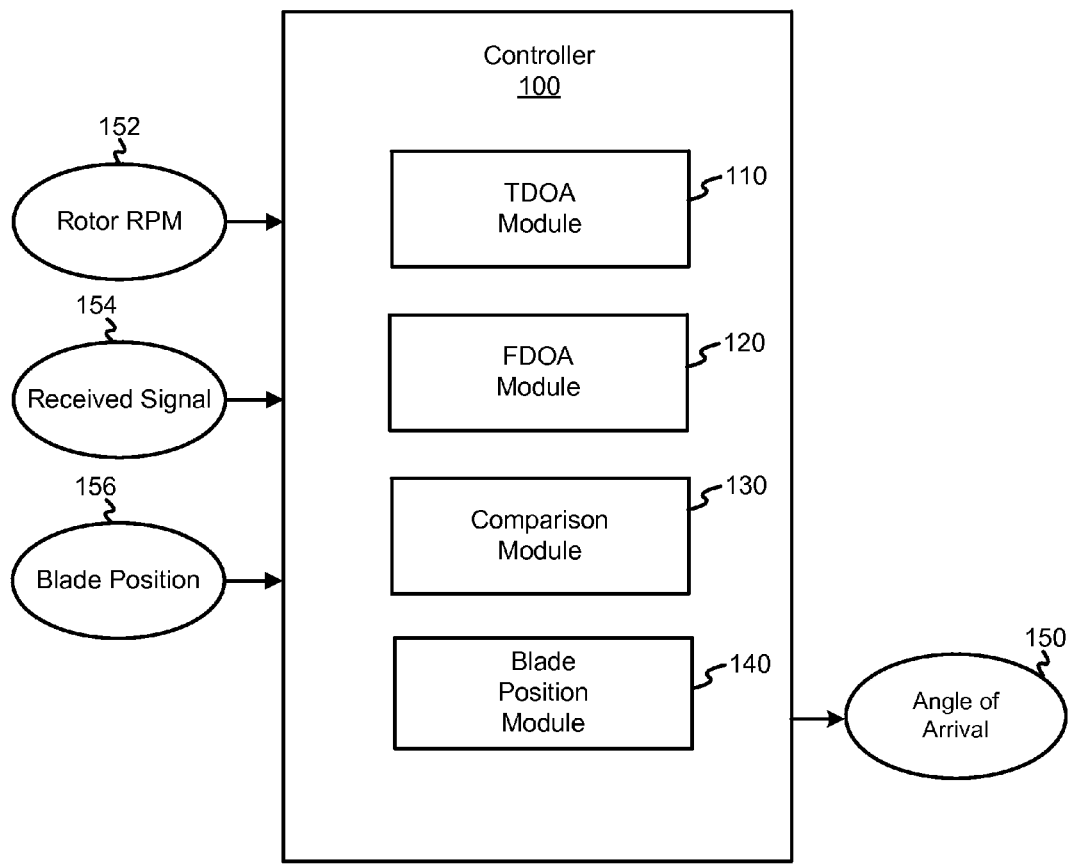
FIG. 4 is a schematic block diagram of a controller of the helicopter of FIG. 1 according to one embodiment.

Referring to FIG. 4, the controller 100 receives one or more inputs, processes the inputs, and generates one or more outputs. The inputs are processed by the controller 100 using modules that execute various algorithms, utilize stored data, and utilize other inputs to update the stored data and/or generate output values. The generated output values can be utilized by other components or modules of the controller and/or one or more elements of the tracking system 5 to estimate a position of the helicopter 10 relative to the signal-transmitting platform or other remote airborne or on-ground elements. Although the controller 100 is shown as a single unit, in some embodiments, the controller 100 can include several units in communication with each other, with each unit including one or more modules. Further, the units of a multi-unit controller need not be physically proximate each other, and in fact can be remote from each other, but remain in communication with each other as necessary to perform the functionality of the modules.

In the illustrated embodiment, the controller 100 is located onboard the helicopter 10. However, in some embodiments, the controller 100, or one or more units or modules of the controller, may be located remote from the helicopter 10. For example, one or more units or modules of the controller 100 can be located onboard another aircraft or at a ground control station. When located remotely of the helicopter 10, the controller 100, or remotely located units or modules of the controller, may be communicable with the helicopter via various wireless communication protocols, such as IR, radio, and the like.

Figure 2:
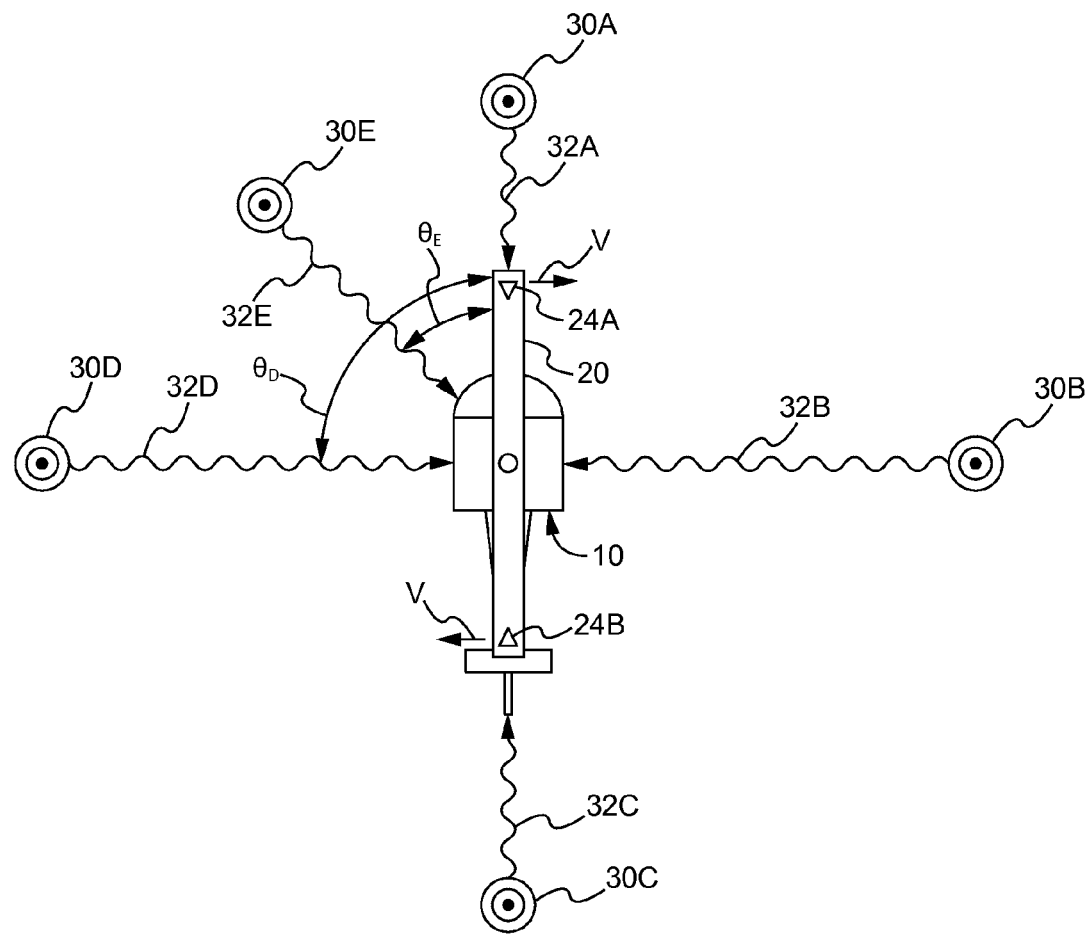
FIG. 2 is a top plan view of the helicopter of FIG. 1 with the blade in a second position relative to the plurality of signal-transmitting platforms according to one embodiment.
Figure 3:
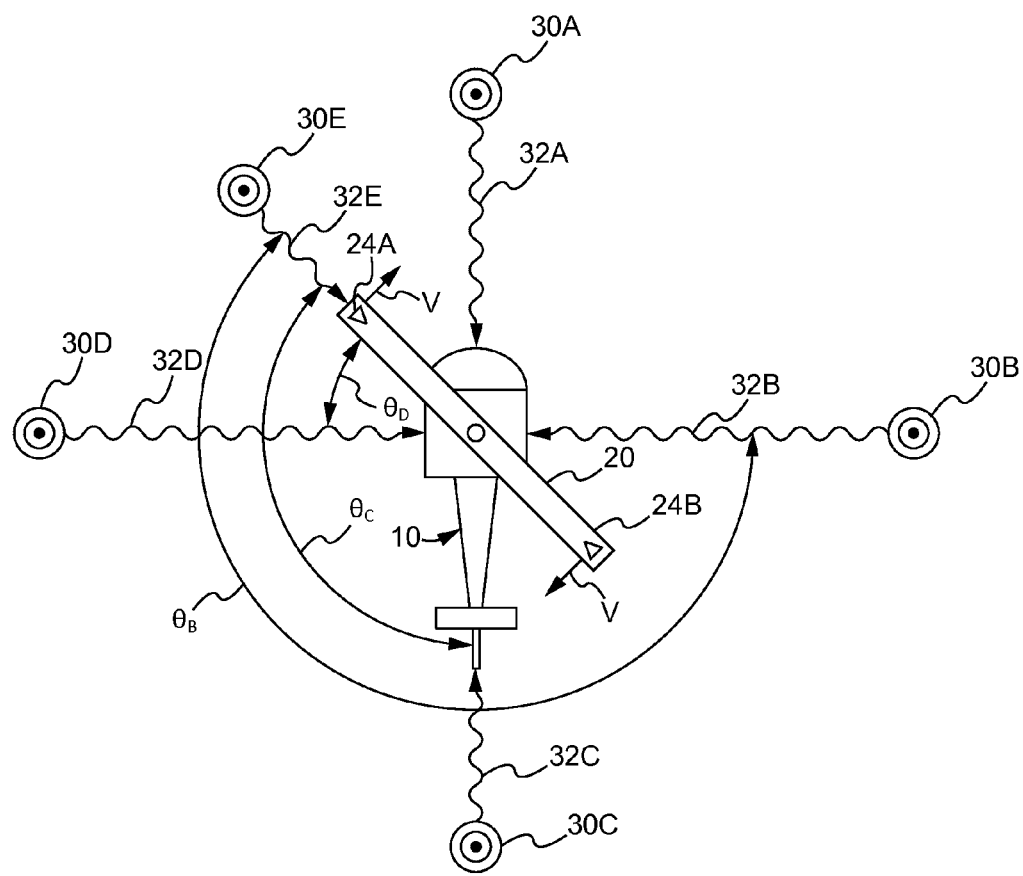
FIG. 3 is a top plan view of the helicopter of FIG. 1 with the blade in a third position relative to the plurality of signal-transmitting platforms according to one embodiment.

The controller 100 of the helicopter 10 is configured to estimate the angle of arrival 150 of a signal from a signal-transmitting platform, such as, for example, one or more of the signals 32A-32E from the signal-transmitting platforms 30A-30E of FIGS. 1-3. Accordingly, the controller 100 includes various modules and stores information for estimating the angle of arrival 150 of the signal. For example, as shown in FIG. 4, the controller 100 includes a TDOA module 110, a FDOA module 120, a comparison module 130, and a blade position module 140. Generally, the modules 110, 120, 130, and 140 cooperate to generate an output (e.g., an estimate of the angle of arrival 150 of a signal) based at least partially on inputs (e.g., a rotor or blade RPM 152 and the received signal 154). In one implementation, the angle of arrival 150 is set equal to the arrival angle θ between the signal (as defined by the direction of propagation of the signal) received by the antennas 24A, 24B of the helicopter 10 and the blade 20 of the helicopter. For example, as shown in FIGS. 1-3, the angle of arrival 150 may be set equal to the respective angles $\theta_A$-$\theta_E$ defined between the signals 32A-32E from the respective signal-transmitting platforms 30A-30E and the blade 20.

The blade 20, in conjunction with the rotor mechanism 14 (e.g., axis of rotation of the blade), define a four-quadrant coordinate system where the blade effectively defines an x-axis with a y-axis extending through the rotor mechanism in a direction perpendicular to the blade and axis of rotation. With a coordinate system defined in this manner, the arrival angle θ of any signal is dependent on the position or orientation of the blade 20. For example, referring to FIG. 1, the arrival angle $\theta_A$ of the signal 32A on the coordinate system defined by the blade 20 is 90-degrees, and the arrival angle $\theta_E$ of the signal 30E on the same coordinate system with is about 135-degrees. But, as shown in FIG. 2, even if the orientation of the helicopter and the direction of the signals 32A, 32E do not change, the arrival angles $\theta_A$, $\theta_E$ change because the coordinate system has rotated with the rotation of the blade 20. For example, with the blade 20 in the position shown in FIG. 2, the arrival angle $\theta_A$ of the signal 32A is 0-degrees and the arrival angle $\theta_E$ of the signal 32E is about 45-degrees. Further rotation of the blade 20 as represented in FIG. 3 yields yet different arrival angles. For example, with the blade 20 in the position shown in FIG. 3, the arrival angle $\theta_E$ of the signal 32E is about 0-degrees.

The TDOA and FDOA modules 110, 120 of the controller 100 each is configure to estimate the arrival angle θ between the signal and the blade 20 on the coordinate system defined by the blade 20 based on TDOA and FDOA approaches, respectively. Generally, the TDOA module 110 estimates the arrival angle θ based on Δt (e.g., the difference between the time the signal arrives at the first antenna 24A and the time the signal arrives at the second antenna 24B). In one specific implementation, the arrival angle θ is estimated based on the following relationship $$\Delta t = \frac{L}{C}\cos\theta \qquad (2)$$

where L is the distance between the antennas 24A, 24B, and C is the speed of propagation of the signal. The signal speed C is predetermined or determined using common techniques known in the art, and is associated with the type of signal. For example, for radio signals, the signal speed C of the signal is typically the speed of light. Because the distance L between the antennas 24A, 24B and the signal speed C are known, the arrival angle θ on the blade-defined quadrant system is calculated by determining (e.g., measuring) the difference between the detected arrival times of the signal at the antennas 24A, 24B.

The arrival angle θ will either be zero, a positive value, or a negative value. However, because the arrival angle θ is determined based on a cosine of θ, which produces the same values for corresponding angles θ on both sides of the x-axis, the estimated value of the arrival angle θ using the TDOA approach is ambiguous because it does not indicate the side of the x-axis with which the estimated arrival angle θ is associated (e.g., the correct quadrant). For example, referring to FIG. 1, for the signal-transmitting platform 30A and corresponding signal 32A, the time difference Δt is zero such that the computed arrival angle θ is either 90-degrees or 270-degrees. In contrast, in FIG. 1, for the signal-transmitting platform 30B, the time difference Δt is equal to +L/C such that the arrival angle θ is 0-degrees. For arrival angles θ off of the x-axis and y-axis, such as the arrival angle $\theta_E$ associated with signal 32E in FIG. 1, the time difference Δt is equal to a negative value less than zero, so it is known that the arrival angle $\theta_E$ is greater than 90-degrees and less than 270-degrees. However, it is unclear from the negative value of the time difference Δt whether the arrival angle $\theta_E$ is greater than or less than 180-degrees. This quadrant ambiguity introduced by the TDOA approach can be resolved by concurrently estimating the same arrival angle θ by the FDOA approach implemented by the FDOA module 120.

Generally, the FDOA module 120 estimates the arrival angle θ based on Δf (e.g., the difference between the frequency of arrival of the signal at the first antenna 24A and the frequency of arrival of the signal at the second antenna 24B). In one specific implementation, the arrival angle θ is estimated based on the following relationship $$\Delta f = \frac{2Vf_0}{C} \sin\theta \qquad (3)$$

where V is the linear velocity of each antenna 24A, 24B, C is the speed of the signal, and $f_0$ is the originating frequency of arrival of the signal. The origination frequency $f_0$ can be determined by various methods. In one embodiment, the frequency $f_0$ can be determined by averaging the frequency of arrival of the signal at the first antenna 24A and the frequency of arrival of the signal at the second antenna 24B. Because the linear velocity V, the signal speed C, and the originating frequency $f_0$ are known, the arrival angle θ on the blade-defined quadrant system is calculated by determining (e.g., measuring) the difference between the detected frequencies of the signal upon arrival at the antennas 24A, 24B. Because of the Doppler effect, the frequency of arrival of the signal changes as the antennas 24A, 24B move away from or towards the signal-transmitting platform transmitting the signal.

Similar to the TDOA approach, under the FDOA approach, the arrival angle θ will either be zero, a positive value, or a negative value. However, because the arrival angle θ is determined based on a sine of 8, which produces the same values for corresponding angles θ on both sides of the y-axis, the estimated value of the arrival angle θ using the FDOA approach is ambiguous because it does not indicate the side of the y-axis with which the estimated arrival angle θ is associated (e.g., the correct quadrant). For example, referring to FIG. 1, for the signal-transmitting platform 30A and corresponding signal 32A, the frequency difference Δf is either +2Vf₀/C such that the arrival angle $θ_A$ is 90-degrees. In contrast, in FIG. 1, for the signal-transmitting platform 30B, the frequency difference Δf is zero such that the computed arrival angle θ is either 0-degrees or 180-degrees. For arrival angles θ off of the x-axis and y-axis, such as the arrival angle $θ_E$ associated with signal 32E in FIG. 1, the frequency difference Δf is equal to a positive value more than zero, so it is known that the arrival angle $θ_E$ is greater than 0-degrees and less than 180-degrees. However, it is unclear from the positive value of the frequency difference Δf whether the arrival angle $θ_E$ is greater than or less than 90-degrees.

In one embodiment, the comparison module 130 resolves the quadrant ambiguity of the estimated arrival angle θ by comparing the arrival angle θ estimated by the TDOA module 110 and the arrival angle θ estimated by the FDOA module 120. For example, the ambiguity introduced by the FDOA approach can be resolved by estimating the same arrival angle θ by the TDOA approach implemented by the TDOA module 110. For example, the arrival angle θ determined by the TDOA module 110 using the TDOA approach indicates which side of the y-axis the arrival angle θ estimated by the FDOA module 120 is on. In contrast, as discussed above, the arrival angle θ determined by the FDOA module 120 using the FDOA approach indicates which side of the x-axis the arrival angle θ estimated by the TDOA module 110 is on.

In some embodiments, the duration of the received signal may be relatively short when compared to period of rotation of the rotating blade, so that the TDOA and FDOA do not change substantially during the interval when the signal is received. In such cases, TDOA and FDOA may be calculated on the received signal as a whole and used for determining the signal's angle of arrival. In other embodiments, the duration of the signal and the period of rotation of the rotating blade may be such that the TDOA and FDOA may change substantially during the interval when the signal is received. In such cases, the signal may be divided into intervals short enough so that that the TDOA and FDOA do not change substantially during each interval. The angle of arrival of the signal may then be determined by combining the calculated angle of arrivals from multiple, successive TDOAs and FDOAs from each interval of the signal. In the case above, as well as in the case where a continuous wave signal is received by the system, multiple techniques are available for determining the angle of arrival of the signal. For example, if the FDOA is computed of the signal arriving at the two antennas as the blade rotates, the FDOA may vary approximately sinusoidally and be at its maximum when the signal source is at an angle of 90 degrees relative to the blade. In cases such as this, as well as others, the angle of arrival of the signal may be computed during multiple rotations of the blade. Various combinations of these techniques, as well as others, including calculating the phase difference of the signal arriving at the two antennas in addition to TDOA and/or FDOA, are available to determine the angle of arrival of the signal. These techniques may involve interpolation or extrapolation of the signal.

In addition to the techniques mentioned above, if an antenna, or combination of antennas, is employed in the rotating blade where the gain of the antennas depends upon direction, then the manner in which the amplitude of the signal varies as the blade rotates may also be used to determine the direction of arrival of the signal. For example, the received signal amplitude may be at a maximum when the signal is arriving from the direction in which the antenna gain is at a maximum.

In one embodiment, the arrival angle θ estimated by the TDOA module 110 is considered a more accurate estimate than the arrival angle θ estimated by the FDOA module 120. Accordingly, in such an embodiment, the estimated arrival angle θ determined by the FDOA module 120 is used merely to resolve the ambiguity of the estimated arrival angle θ determined by the TDOA module 110. In contrast, according to another embodiment, the arrival angle θ estimated by the FDOA module 120 is considered a more accurate estimate than the arrival angle θ estimated by the TDOA module 110. Accordingly, in such an alternative embodiment, the estimated arrival angle θ determined by the TDOA module 110 is used merely to resolve the ambiguity of the estimated arrival angle θ determined by the FDOA module 120. In either embodiment, the controller 100 sets the angle of arrival 150 equal to, or based on, one of the arrival angle θ estimated by the TDOA module 110 and the arrival angle θ estimated by the FDOA module 120.

According to some embodiments, the comparison module 130 is configured to calculate the estimated arrival angle θ based on a weighted average of the arrival angle θ estimated by the TDOA module 110 and the arrival angle θ estimated by the FDOA module 120. The estimated arrival angle θ can be calculated based on any of various averaging or weighting techniques known in the art. For example, in one implementation, the estimated arrival angle θ is the arithmetic mean of the arrival angle θ estimated by the TDOA module 110 and the arrival angle θ estimated by the FDOA module 120. As another example, in one implementation, the estimated arrival angle θ is a weighted average of the arrival angle θ estimated by the TDOA module 110 and the arrival angle θ estimated by the FDOA module 120. The weighted average may be based on a higher confidence in the accuracy of one of the estimated arrival angles θ over the other. For example, in one implementation, the arrival angle θ estimated by the TDOA module 110 is more accurate than the arrival angle θ estimated by the FDOA module 120 because, under certain operating conditions and for certain applications, the TDOA approach naturally yields more accurate results for reciprocating or oscillating antennas. Alternatively, or additionally, the weighted average may be based on the variance of the errors of the arrival angle θ estimated by the TDOA module 110 and the arrival angle θ estimated by the FDOA module 120. If an estimated arrival angle θ is calculated, the controller 100 can set the angle of arrival 150 equal to, or based on, the estimated arrival angle θ determined by the comparison module 130.

Although not shown, the helicopter 10 of the tracking system 5 may include more than one rotatable blade 20 each with a pair of spaced-apart antenna. In such embodiments, the controller 100 may be configured to determine an estimated arrival angle θ for each blade using the same TDOA and FDOA techniques as described above. Because each of the blades would define a separate coordinate system, the estimated arrival angles θ of the blades would be different. Accordingly, for multiple-blade and multiple antenna-pair embodiments, the comparison module 130 may be configured to equalize the coordinate systems for proper comparison of the estimated arrival angles 8. In some implementations, comparison of the estimated arrival angles 8 of the blades includes averaging the estimated arrival angles θ and calculating an average estimated arrival angle θ. Because each blade and spaced-apart antenna pair effectively estimates the same arrival angle θ, the average of the estimated arrival angle θ can provide a more accurate estimate of the actual arrival angle. A similar effect can be realized by utilizing an additional helicopter 10 with a blade 20 having spaced-apart antenna. Accordingly, the accuracy of the arrival angle θ estimated by the tracking system 5 can be enhanced by adding additional blades with spaced-apart antennas to the helicopter 10, and/or adding additional helicopters.

Referring to FIG. 4, the blade position module 140 of the controller 100 (which can be described as an movable component position module) determines a relative position of the blade 20 (e.g., movable component) relative to the body 10 (e.g., object) at any given moment in time based on input (e.g., blade position 156) from a blade position sensor (e.g., movable component position sensor). Although not shown, the blade position sensor can be any of various types of sensors (e.g., hall effect sensors, optical sensors, inductive sensors, and the like) designed to detect the position of a rotor of the rotor mechanism 14 driving rotation of the blade 20. Because the blade 20 is fixed to the rotor and co-rotates relative to the rotor, the position of the rotor corresponds with the position of the blade 20. Based on a known relationship between the detected position of the blade 20 and the body 12 of the helicopter, the blade position module 140 determines the relative position of the blade, which is the position of the blade with respect to a position of the body. In this manner, the controller 100 knows where the blade 20 is positioned on the body 12 at any moment in time and knows the angle the blade forms with some reference on the body, which most commonly is the longitudinal axis of the body.

As discussed above, the estimated arrival angle θ is dependent on the position of the rotating blade 20 when the signal is received by the antennas 24A, 24B. Accordingly, when set equal to the estimated arrival angle θ, the angle of arrival 150 for a given signal-transmitting platform changes as the position of the blade 20 changes (e.g., as the blade rotates about the rotor mechanism 15). In certain implementations, it may be desirable to estimate an angle of arrival that does not change with changing blade position. For example, in some implementations, estimating an angle of arrival defined by the body 12 of the helicopter 10, as opposed to the blade 20, may be desirable. By knowing the position of the blade 20 with respect to some reference on the body 12 of the helicopter 10, an estimated arrival angle θ (e.g., estimated arrival angles $\theta_A$-$\theta_E$) defined with respect to the position of the blade 20 can be converted to an angle defined with respect to the reference on the body of the helicopter. Accordingly, in some implementations, the blade position module 140 is configured to convert the estimated arrival angle θ defined with respect to the position of the blade 20 to a converted estimated arrival angle θ defined with respect to a reference on the body of the helicopter 10. The controller 100 can be configured to set the angle of arrival 150 equal to the converted estimated arrival angle θ as desired.

Although not shown, the controller 100 can include a transmission module that communicates the estimated angle of arrival 150 to one or more remote elements for further processing, such as to determine an exact location of the helicopter 10 or determine other useful location information as desired.

Figure 5:
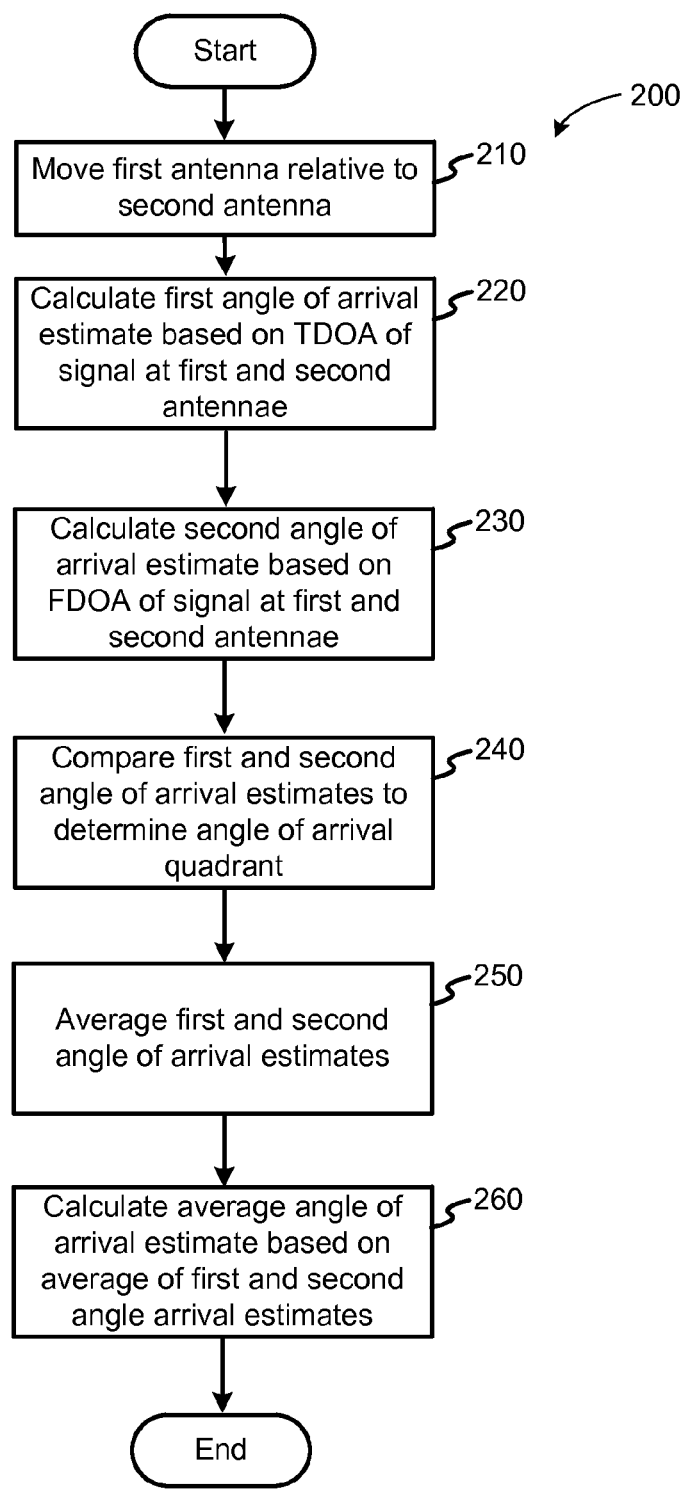
FIG. 5 is a schematic flow diagram of a method for estimating an angle of arrival of a signal according to one embodiment.

Referring to FIG. 5, a method 200 for estimating an angle of arrival of a signal is shown. In some implementations, the method 200 is executed by the controller 100 and associated modules as described above. The method 200 includes moving a first antenna relative to a second antenna at 210. Further, the method 200 includes calculating a first angle of arrival estimate based on a TDOA approach at 220 (which can include measuring a difference between a time the signal arrives at the first antenna and a time the signal arrives at the second antenna), and calculating a second angle of arrival estimate based on a FDOA approach at 230 (which can include measuring a difference between a frequency of arrival of the signal at the first antenna and a frequency of arrival of the signal at the second antenna). The first and second angle of arrival estimates are compared at 240 to determine an angle of arrival quadrant (e.g., to resolve an ambiguity associated with one of the first and second angle of arrival estimates). The method 200 also includes averaging the first and second angle of arrival estimates at 250 and calculating an average or weighted angle of arrival estimate at 260 based on some average (e.g., weighted average) of the first and second angle of arrival estimates.

As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wire-line, optical fiber, Radio Frequency (RF), or the like, or any suitable combination of the foregoing In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by the processor.

Program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program product may be shared, simultaneously serving multiple customers in a flexible, automated fashion. The computer program product may be standardized, requiring little customization and scalable, providing capacity on demand in a pay-as-you-go model.

The computer program product may be stored on a shared file system accessible from one or more servers. The computer program product may be executed via transactions that contain data and server processing requests that use Central Processor Unit (CPU) units on the accessed server. CPU units may be units of time such as minutes, seconds, hours on the central processor of the server. Additionally the accessed server may make requests of other servers that require CPU units. CPU units are an example that represents but one measurement of use. Other measurements of use include but are not limited to network bandwidth, memory usage, storage usage, packet transfers, complete transactions etc.

Aspects of the embodiments may be described above with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

The present subject matter may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for estimating an angle of arrival of a signal transmitted from a signal-transmitting platform at a signal-receiving platform, the signal-receiving platform comprising an object and a movable component coupled to the object, wherein the movable component comprises spaced-apart first and second antennas, the apparatus comprising:

a time-difference-of-arrival (TDOA) module configured to determine a difference between a time the signal arrives at the first antenna and a time the signal arrives at the second antenna;

a frequency-difference-of-arrival (FDOA) module configured to determine a difference between a frequency of arrival of the signal at the first antenna and a frequency of arrival of the signal at the second antenna; and a comparison module configured to estimate the angle of arrival of the signal based on a comparison between the difference between the time the signal arrives at the first antenna and the time the signal arrives at the second antenna and the difference between the frequency of arrival of the signal at the first antenna and the frequency of arrival of the signal at the second antenna.

2. The apparatus of claim 1, wherein the TDOA module estimates a first angle of arrival based on the difference between the time the signal arrives at the first antenna and the time the signal arrives at the second antenna, and the FDOA module estimates a second angle of arrival based on the difference between the frequency of arrival of the signal at the first antenna and the frequency of arrival of the signal at the second antenna, wherein the comparison module is configured to estimate the angle of arrival of the signal based on a comparison between the first angle of arrival and the second angle of arrival.

3. The apparatus of claim 2, wherein the comparison between the first angle of arrival and the second angle of arrival comprises calculating an average of the first angle of arrival and the second angle of arrival.

4. The apparatus of claim 3, wherein the average of the first angle of arrival and the second angle of arrival is a weighted average based on a higher confidence in the accuracy of one of the first angle of arrival and the second angle of arrival.

5. The apparatus of claim 3, wherein the average of the first angle of arrival and the second angle of arrival is a weighted average based on a variance of errors of the first angle of arrival and the second angle of arrival.

6. The apparatus of claim 2, wherein the comparison module estimates the angle of arrival by setting the angle of arrival approximately equal to the first angle of arrival and resolving quadrant ambiguity based on the second angle of arrival.

7. The apparatus of claim 2, wherein the comparison module estimates the angle of arrival by setting the angle of arrival approximately equal to the second angle of arrival and resolving quadrant ambiguity based on the first angle of arrival.

8. The apparatus of claim 2, wherein the TDOA module estimates the first angle of arrival based further on a distance between the first and second antennas and a speed of the signal.

9. The apparatus of claim 2, wherein the TDOA module estimates the first angle of arrival according to the following relationship $$\Delta t = \frac{L}{C}\cos\theta,$$

wherein $\Delta t$ represents the difference between the time the signal arrives at the first antenna and the time the signal arrives at the second antenna, L represents a distance between the first and second antennas, C represents a speed of the signal, and $\theta$ represents the first angle of arrival.

10. The apparatus of claim 2, wherein the FDOA module estimates the second angle of arrival based on a velocity of the first and second antennas, an origination frequency of arrival of the signal, and a speed of the signal.

11. The apparatus of claim 2, wherein the FDOA module estimates the second angle of arrival according to the following relationship $$\Delta f = \frac{2Vf_0}{C}\sin\theta,$$

wherein $\Delta f$ represents the difference between the frequency of arrival of the signal at the first antenna and the frequency of arrival of the signal at the second antenna, V represents a linear velocity of the first and second antennas, $f_0$ represents an origination frequency of arrival of the signal, C represents a speed of the signal, and $\theta$ represents the second angle of arrival.

12. The apparatus of claim 1, further comprising a movable component position module configured to determine a position of the movable component relative to the object and modify the angle of arrival of the signal based on the position of the movable component relative to the object.

13. A method for estimating an angle of arrival of a signal from a signal-transmitting platform, comprising:
  moving a first antenna in a first direction relative to the signal-transmitting platform;
  moving a second antenna in a second direction relative to the signal-transmitting platform, wherein the second antenna is spaced apart from the first antenna and the first direction is different than the second direction;
  receiving a signal at the first antenna and the second antenna;
  measuring a difference between a time the signal arrives at the first antenna and a time the signal arrives at the second antenna while the first antenna is moving relative to the second antenna;
  measuring a difference between a frequency of arrival of the signal at the first antenna and a frequency of arrival of the signal at the second antenna while the first antenna is moving relative to the second antenna; and
  estimating an angle of arrival of the signal based on the difference between the time the signal arrives at the first antenna and the time the signal arrives at the second antenna, and the difference between the frequency of arrival of the signal at the first antenna and the frequency of arrival of the signal at the second antenna.

14. The method of claim 13, further comprising:
  estimating a first angle of arrival based on the difference between the time the signal arrives at the first antenna and the time the signal arrives at the second antenna; and
  estimating a second angle of arrival based on the difference between a frequency of arrival of the signal at the first antenna and the frequency of arrival of the signal at the second antenna;
  wherein estimating the angle of arrival of the signal comprises comparing the first angle of arrival and the second angle of arrival.

15. The method of claim 14, wherein comparing the first angle of arrival and the second angle of arrival comprises determining an average of the first angle of arrival and the second angle of arrival, and wherein estimating the angle of arrival of the signal comprises setting the angle of arrival equal to the average of the first angle of arrival and the second angle of arrival.

16. The method of claim 13, wherein moving the first antenna relative to the second antenna comprises rotating the first antenna about an axis and rotating the second antenna about the axis.

17. The method of claim 13, wherein moving the first antenna relative to the second antenna comprises moving the first and second antennas relative to an object, the method further comprising determining a position of the first and second antennas relative to the object and modifying the angle of arrival of the signal based on the position of the first and second antennas relative to the object.

18. A system for estimating an angle of arrival of a signal, comprising:
  a signal-transmitting platform configured to generate and transmit a signal;
  an object remote from and movable relative to the signal-transmitting platform;
  a movable component movably coupled to the object;
  at least first and second spaced-apart antennas coupled to the movable component; and
  a controller configured to estimate an angle of arrival of a signal based on a difference between a time the signal arrives at the first antenna and a time the signal arrives at the second antenna while the movable component is moving, and a difference between a frequency of arrival of the signal at the first antenna and a frequency of arrival of the signal at the second antenna while the movable component is moving.

19. The system of claim 18, wherein the object is a body of a helicopter, and the movable component is a blade rotatably coupled to the body, and wherein the first and second spaced-apart antennas are positioned at respective end portions of the blade.

20. The system of claim 19, further comprising a blade position sensor configured to detect a position of the blade with respect to the body, and wherein the controller is configured to estimate the angle of arrival of the signal based on the position of the blade with respect to the body.

21. The system of claim 19, wherein the blade is a first blade, the system further comprising a second blade rotatably coupled to the body of the helicopter, and at least third and fourth spaced-apart antennas coupled to the second blade, wherein the controller is configured to estimate an angle of arrival of a signal based on a difference between a time the signal arrives at the third antenna and a time the signal arrives at the fourth antenna while the second blade is moving, and a difference between a frequency of arrival of the signal at the third antenna and a frequency of arrival of the signal at the fourth antenna while the second blade is moving.

\* \* \* \* \*